R. EICKEMEYER.
HARVESTER.
No. 101,719.  Patented Apr. 12, 1870.
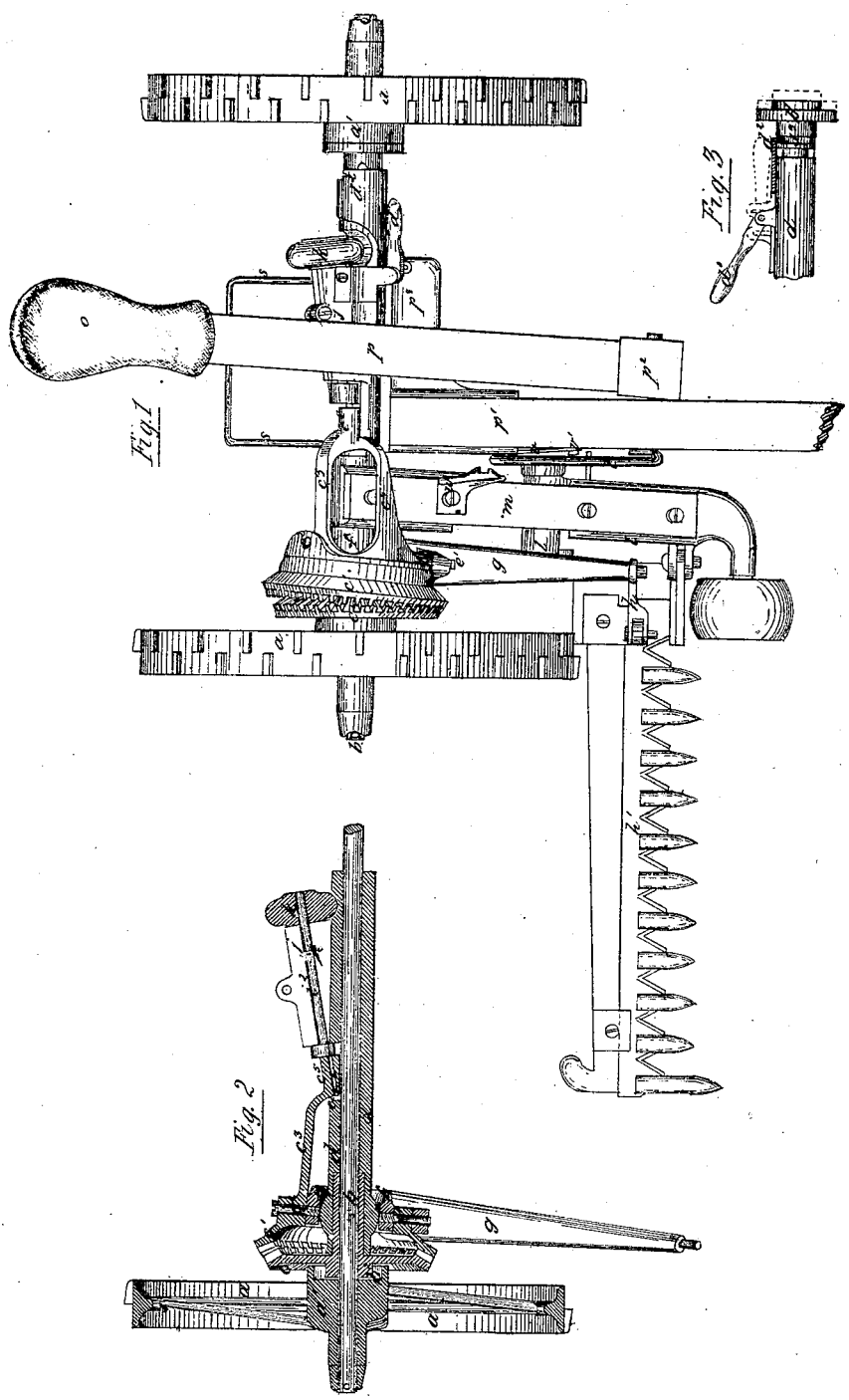

6 Sheets—Sheet 2.
R. EICKEMEYER.
HARVESTER.
No. 101,719. Patented Apr. 12, 1870.
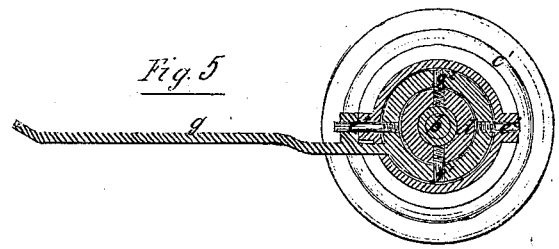
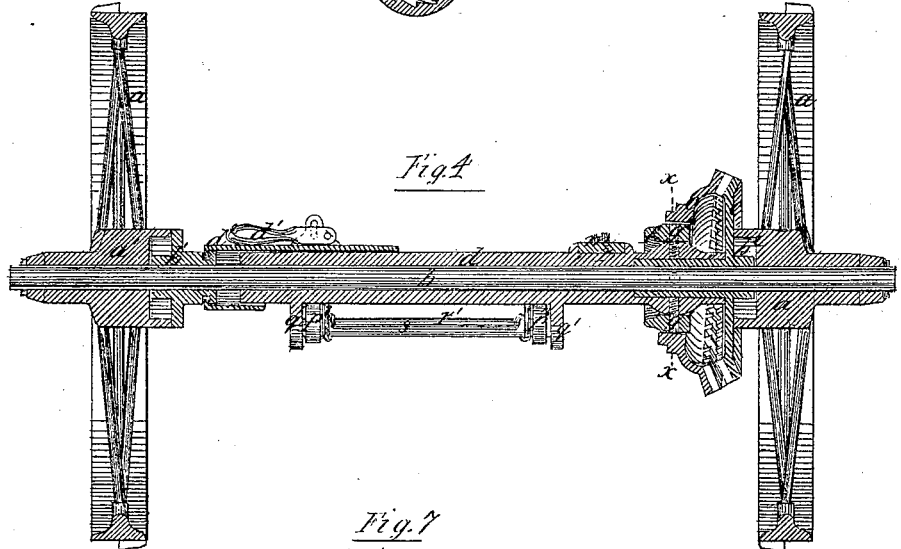
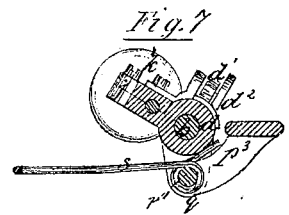
Witnesses:
H. A. Topham
Joseph Campbell
R. Eickemeyer
Inventor
by F. C. Tuthill Jr.
atty 6 Sheets—Sheet 3.

R. EICKEMEYER.
HARVESTER.

No. 101,719. Patented Apr. 12, 1870.

R. EICKEMEYER.
HARVESTER.
No. 101,719. Patented Apr. 12, 1870.
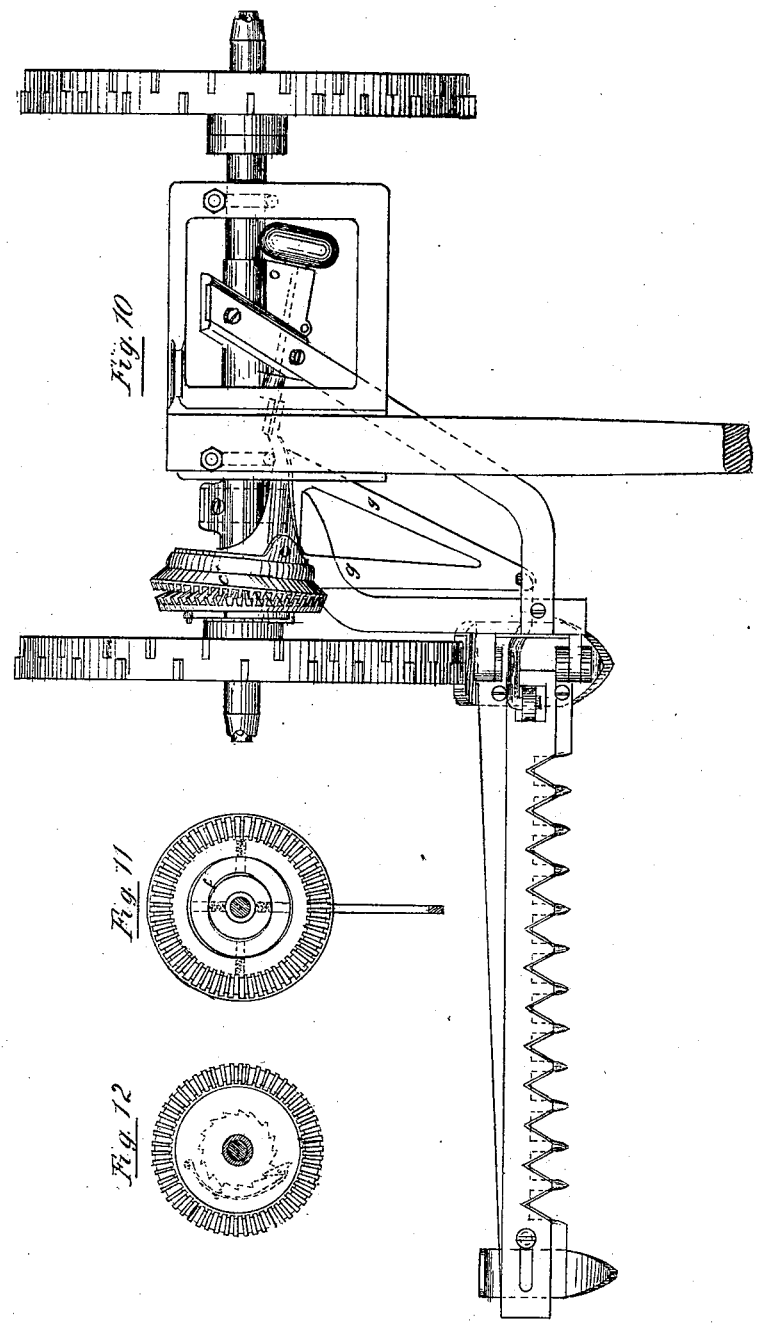

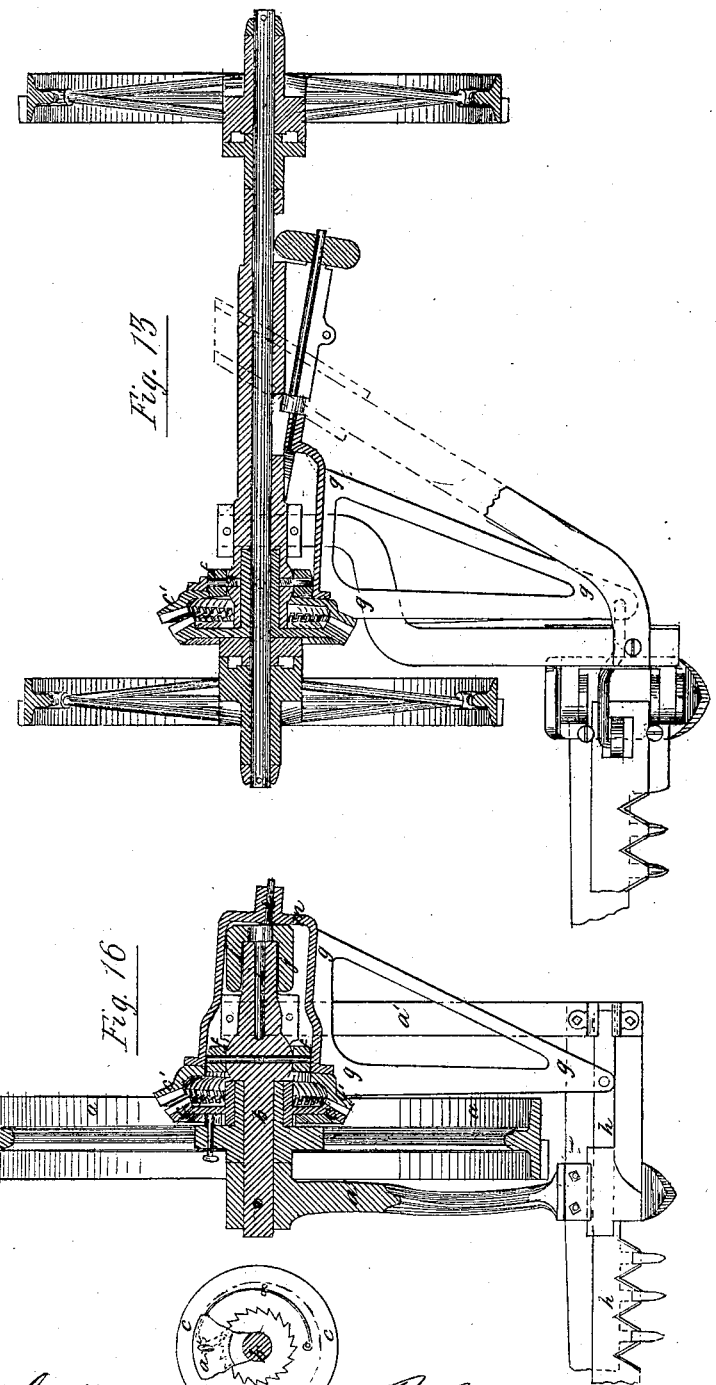

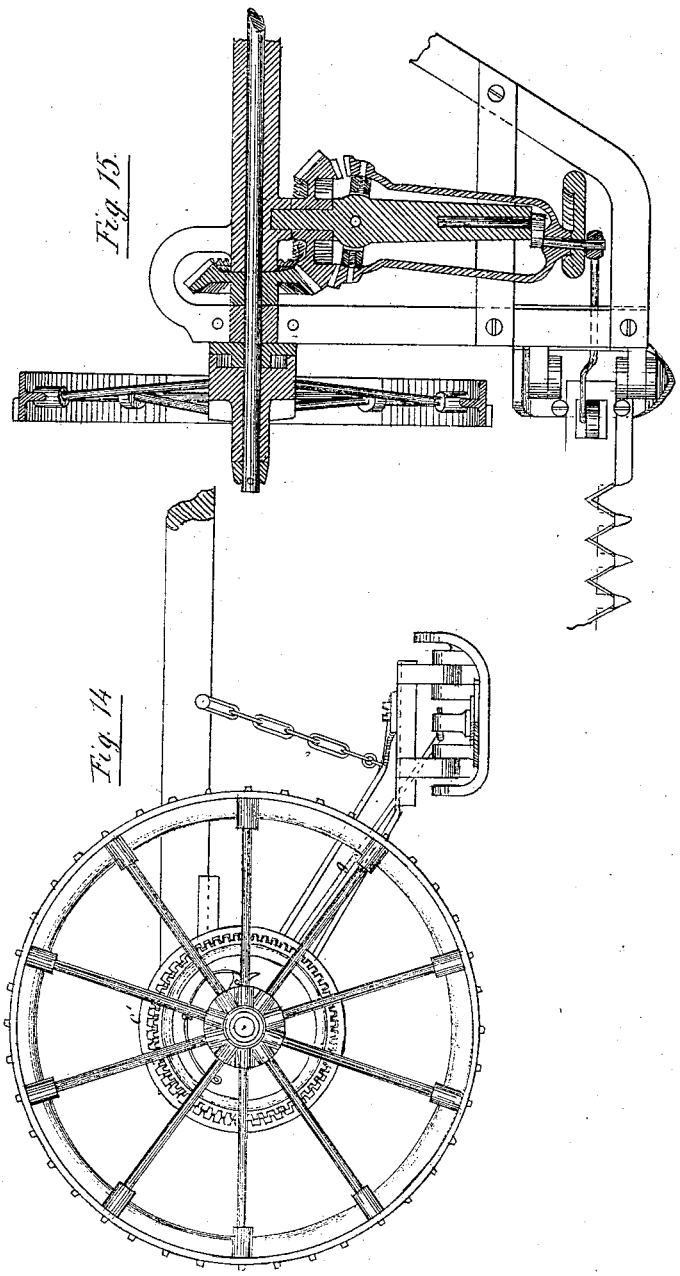

United States Patent Office.

RUDOLF EICKEMEYER, OF YONKERS, NEW YORK.

Letters Patent No. 101,719, dated April 12, 1870.

IMPROVEMENT IN HARVESTERS.

The Schedule referred to in these Letters Patent and making part of the same.

Be it known that I, RUDOLF EICKEMEYER, of Yonkers, in the county of Westchester and State of New York, have invented certain new and useful Improvements in Mowing and Reaping-Machines; and I do hereby declare that the following is a full and correct description thereof, reference being had to the accompanying drawings and to the letters of reference thereon.

The first part of my invention relates to mechanism for giving motion to the cutter-bar, and consists in combining with the main axle or shaft of a mowing or reaping-machine, and the cutter-bar or its pitman-connection, a rotating wheel which rotates with the main axle, and an oscillating wheel which does not rotate but swings upon gimbal joints, the combination and arrangement of the mechanism being such, substantially as hereinafter described, that the motion required for the cutter-bar is obtained by the action of the two gear-wheels.

My invention further consists in a lever and link-connection with the pole and finger-beam, whereby the cutting apparatus is first raised at the outer end and then lifted at the heel and folded over and secured in an upright position, so as to be portable.

Also in a lever-connection with the sleeve below the driver's seat, whereby the driver may apply his weight to lifting the heel of the cutting apparatus from the ground to avoid obstructions.

The drawings upon sheets 1, 2, and 3, represent the form of construction I prefer for my Improvements adapted to a mowing-machine.

The drawings upon sheets 4, 5, and 6, represent modifications in construction adapted to reapers and mowers.

I will first proceed to describe the mowing-machine represented by the drawings upon sheets 1, 2, and 3, of which—

Figure 1 is a plan view of the mower.

Figure 2, a partial horizontal section.

Figure 3 a detached view of the clutch-connection.

Figure 4, a vertical longitudinal section looking from the rear of the machine.

Figure 5, a transverse section through dotted lines $x\ x$, fig. 3, showing axle-shaft, sleeve, vibrating lever, oscillating gear-wheel, and the gimbal joint Figure 6, a detached section of pawl and ratchet-connection between wheel-hubs and axle.

Figure 7, a detached section of sleeve and pole-connection, showing foot-lever for lifting the frame and heel of the finger-bar.

Figure 8:
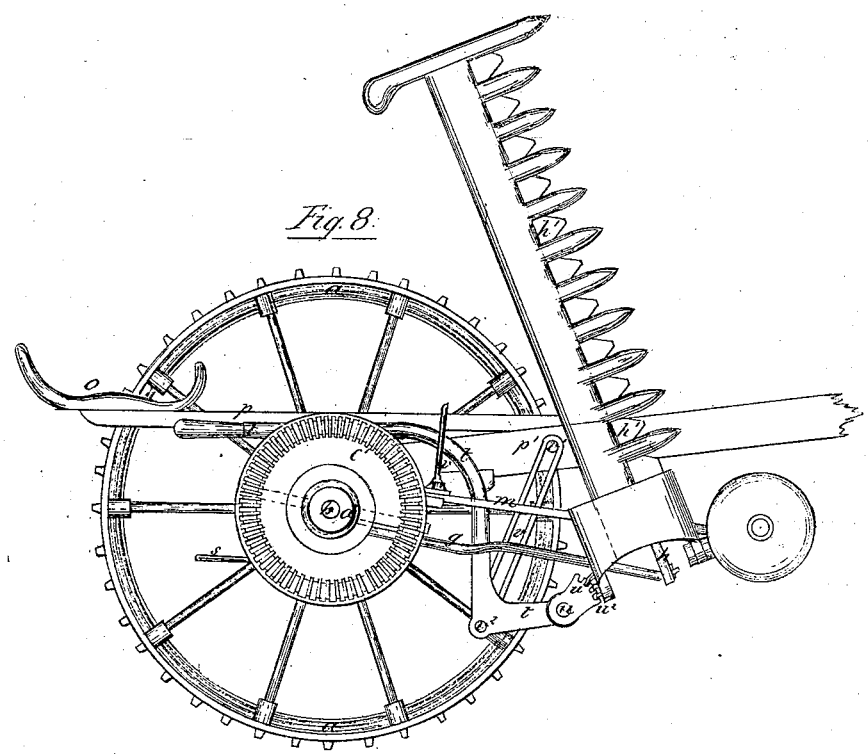

Figure 8, a side elevation, the wheel next to the cutting apparatus and the rotating bevel-wheel being removed.

Figure 9:
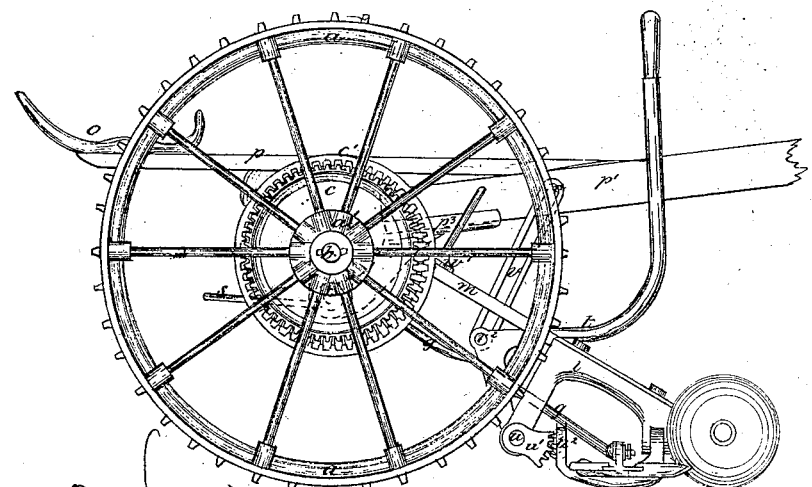

Figure 9, a side elevation of the machine.

Letters $a\ a$ represent the two driving and supporting-wheels.

$a'\ a'$, the hubs.

$b$, the main axle or shaft of the machine.

$b^1\ b^2$, the pawl-flanges on the main axle, which connect by pawls in the usual way with the driving-wheels, so that either or both driving-wheels operate the cutter-bar, the pawl-flange $b^2$ being attached to and forming a part of a bevel gear-wheel $c$; also fast to the main axle, and rotating with it.

The sleeve $d$ is loose on the main axle, and is moved upon it longitudinally by a shifting-lever, $d^1$, and a clutch, $d^2$, connecting by a clutch-groove, $d^3$, with the pawl-flange $b^1$, as shown in the drawings.

The bevel gear-wheel $c$ gears into an internal bevel-wheel, $c^1$, which does not rotate but oscillates upon opposite pins or studs, $e^1\ e^2$, fig. 5, fixed in the hub $f$ of a vibrating arm or lever, $g$, which itself oscillates upon two opposite pins, $g^1\ g^2$, fig. 5, fixed in the sleeve and extending in opposite directions in bearings in the hub. The pin-joints of the hub of the vibrating lever and of the hub of the internal toothed bevel-wheel being at right angles to each other, a gimbal joint is formed, which permits the oscillating bevel-wheel to roll on the gear of the rotating bevel-wheel, while the vibrating lever has only a lateral vibration in straight lines.

The vibrating lever is connected by a short link, $h$, to the cutter-bar $h^1$.

The oscillating bevel gear-wheel $c^1$ has one or two more teeth than the rotary bevel gear-wheel $c$, so that, supposing the latter has fifty-six teeth and the former fifty-eight teeth, the vibrating lever and cutter-bar will be made to vibrate twenty-eight times for every revolution of the main shaft or axle, which is about the motion required for the cutter-bar.

The lines which form the teeth in both gears, center in a point in the axis of the main shaft, which point is the center of oscillation of the gimbal joint.

The bevel-wheels should be so constructed that the angle of vibration of the oscillating bevel-wheel is the same as the angle of vibration of a lever, making the length of throw necessary to carry the knives of the cutter-bar the distance required to correspond with the fingers on the finger-bar.

The oscillating bevel gear-wheel $c^1$ has arms, $c^2\ c^3\ c^4$, which extend inward toward the middle of the machine, and unite in a boss, $c^5$, which receives the crank-pin $i$ of a fly-wheel shaft, $i^2$, which rotates in a bracket-bearing, $j$, cast upon the sleeve, and has a fly-wheel, $k$, fast to the further end.

The oscillation of the bevel-gear $c^1$ imparts rotary motion to the fly-wheel, the number of revolutions corresponding to the number of full strokes of the cutter-bar, as is the case in fly-wheels connected with other cutter-bar motions in reapers and mowers, the object being the same, viz: to equalize the motion of the cutter, and protect the gear from sudden strains.

It will be observed that both the crank-pin and fly-wheel shaft are in lines that intersect the center of oscillation of the gear-wheel, the fly-wheel shaft being thrown out of line with the axis of the main shaft or axle, to get room for the fly-wheel.

If desired, the vibrating lever may be attached rigidly to the outside of the gear-wheel, as in a modification hereinafter described, but in such case the gimbal joint must be preserved by a ring in place of the hub of the vibrating lever, pivoted to the sleeve in the same manner, and then the construction will be inferior, because of the compound motion thereby given to the end of the vibrating lever which connects with the cutter-bar pitman.

The cutting apparatus is hinged by the shoe, as usual, to a cast-iron frame or hanger, $l$, connected to the sleeve by a wrought-iron bar, $m$, of sufficient strength, the sleeve having a seat, $r$, cast upon it to receive the bar, which is bolted thereto and to the shoe-hanger by screw-bolts, as is shown in the drawings.

The oscillating bevel gear-wheel is engaged with and released from the fixed rotating bevel-wheel by moving the clutch shifter before described, the sleeve being free either to turn or move longitudinally upon the main axle.

The driver's seat $o$ is fixed upon a wooden spring, $p$, jointed to the pole $p^1$ at $p^2$, the seat being placed behind the axle to balance the pole.

The pole is hinged to hangers or brackets, $q$ $q^1$, cast on the sleeve and extending downward from the same about a quarter of the radius of the supporting-wheels, to relieve the shoe of part of the weight.

A round rod, $r'$, forms the hinge-connection between the pole-iron $p^3$ and the sleeve-hangers $q$ $q'$.

Beneath the sleeve, and under the driver's seat, so that he can rest upon it with his feet, is a lever, $s$, made of round iron bent in the form shown in the drawings, which, being pivoted upon the pole hinge-rod $r'$, and the short ends resting on the sleeve, when pressed upon by the weight of the driver, turns the sleeve so as to lift the shoe of the cutting-apparatus, to avoid obstructions in the line of the shoe.

The outer end of the finger-bar is lifted, to avoid obstructions, by the bent lever $t$, which connects with the shoe of the cutting apparatus by a rock-shaft, $u$, in the shoe-hanger, and segments of teeth $u^1$ $u^2$ respectively placed upon the rock-shaft and shoe, so that, when the lever $t$ is moved toward the driver, the outer end of the finger-bar is raised as described.

The same lever is also connected by a slotted link, $v$, with the pole, the slots in the link sliding on the headed pin $v^1$ driven into the pole, and the connection with the lever being by a joint, $v^2$, the construction being such that when the lever is moved toward the driver the slot in the link permits the outer end of the finger-bar to be raised without raising the inner end from the ground, until the end of the slot is reached, when the link is arrested by the pin, and the bent lever finds a new fulcrum upon the other end of the link thus supported by the pole, and the operation of lifting the inner end of the cutting-mechanism and the hinged frame commences, while at the same time the cutter-bar is folded in an upright position, as shown in the drawings, where it may be secured by a catch, $w$, upon the standard $w'$.

When the cutting apparatus is in action, the slotted link-connection with the bent lever above described prevents the driving and supporting-wheel behind the cutting-apparatus from being thrown over, so as to upset the machine, when the cutting-apparatus or leader-wheel meets with a rigid obstruction.

The short link between the vibrating lever and cutter-bar permits the cutting apparatus to be lifted and folded without stopping the motion of the vibrating lever.

A modification of the above mowing-machine is shown in figs. 10, 11, and 12, sheet 4, fig. 13, sheet 5, and fig. 14, sheet 6.

Figure 10 being a plan view of the mower.

Figure 11, a detached section through the main shaft, showing the oscillating bevel-wheel and gimbal-joint.

Figure 12, a section through main axle, showing the rotating bevel gear-wheel and pawl-connection.

Figure 13, a longitudinal section through the shaft-sleeve and gearing.

Figure 14, a side elevation of the machine.

In this mower the oscillating bevel-gear $c^1$ is jointed to a gimbal-ring, $f$, instead of the hub of the vibrating lever, as in the machine before described, and the vibrating lever $g$ is directly and rigidly connected with the oscillating bevel gear-wheel and its arms.

The fly-wheel and shaft are thrown under the axle to give room for the frame, and the frame is supported upon the axle.

I do not think it necessary to give a further description of this modification; the drawings sufficiently explain it.

Figure 15, sheet 6, is a partial view of a mower in which the crank-pin of the fly-wheel is connected to the cutter-bar, the oscillating bevel gear-wheel and rotating bevel-gear being connected with the main axle by a pair of miter-wheels.

I do not consider this by any means as good a way to get up the motion for the cutter-bar as the method in which the vibrating lever is used.

Figure 16, sheet 5, is a view of my improvement arranged for a single-wheel reaper.

Letter $a$, the supporting and driving-wheel.

$a^1$ the main frame.

$b$ the main axle.

$c$ rotating bevel-wheel connected by pawl and ratchet-connection to the hub of the supporting-wheel.

$c^1$ the oscillating bevel gear-wheel swinging on a gimbal-joint formed upon the axle by the ring $f$ jointed as before described in the other modifications.

$g$, the vibrating lever connected directly with the cutter-bar $h$.

$i$, the fly-wheel shaft.

$j$, fly-wheel.

$k$, crank-pin formed at the end of a hollow hub or cover, $m$, which is fast to the back of the oscillating bevel-wheel, and houses or covers up the parts it incloses, as shown in the drawings.

I claim as my invention and improvement in reaping and mowing-machines—

1. In combination with the main driving-wheel or wheels and the cutter-bar of a mowing or reaping-machine, the gear-wheels, one of them rotating upon its axis, and the other oscillating upon a gimbal joint, substantially as described.

2. In combination with the rotating and oscillating gear-wheels and cutter-bar, the vibrating lever, substantially as described.

3. The vibrating lever connected to the cutter-bar, in combination with the crank and fly-wheel, substantially as described, whereby the action of the fly-wheel controls and equalizes the operation of the vibrating arm and cutter-bar, as set forth.

5. The bent lever and link-connection with the pole and rock-shaft in the shoe-hanger, in combination with the shoe and finger-bar, whereby the cutting apparatus is lifted at the outer end, and raised at the inner end and folded, substantially as described.

5. The small bevel segment on the inner shoe, in combination with the larger bevel segment and rock-shaft, of the lifting-lever for the purpose of lifting the finger and cutter-bar from a horizontal to a vertical position at one motion of the lever, substantially as described.

6. The arrangement of the lever beneath the driver's seat upon the pole-iron rod, in combination with the sleeve and drooping frame, whereby the inner shoe is lifted when desired.

R. EICKEMEYER.

Witnesses:
 THEODORE FITCH.
 W. F. DRINKWATER.